United States Patent [19]

Fujii et al.

[11] Patent Number: 4,603,941
[45] Date of Patent: Aug. 5, 1986

[54] POLARIZATION-MAINTAINING FIBER SYSTEM AND METHOD OF MANUFACTURING THE SAME

[75] Inventors: Yoshimasa Fujii, Tokyo; Yoshinobu Mitsuhashi, Ibaraki; Osamu Koike, Tokyo, all of Japan

[73] Assignees: Agency of Industrial Science and Technology; Hoya Corporation, both of Tokyo, Japan

[21] Appl. No.: 535,656

[22] Filed: Sep. 26, 1983

[30] Foreign Application Priority Data

Sep. 27, 1982 [JP] Japan .................................. 57-167946
Sep. 27, 1982 [JP] Japan .................................. 57-167947
Sep. 27, 1982 [JP] Japan .................................. 57-167948

[51] Int. Cl.⁴ ............................................. G02B 6/26
[52] U.S. Cl. ................................. 350/96.15; 350/96.20; 350/96.21; 350/96.30
[58] Field of Search ............... 350/96.15, 96.16, 96.20, 350/96.21, 96.29, 96.30

[56] References Cited

U.S. PATENT DOCUMENTS 4,405,198 9/1983 Taylor ................................ 350/96.29

FOREIGN PATENT DOCUMENTS 2924804 1/1981 Fed. Rep. of Germany ... 350/96.29

Primary Examiner—William L. Sikes
Assistant Examiner—Lester Rushin
Attorney, Agent, or Firm—Roberts, Spiecens & Cohen

[57] ABSTRACT

In an optical fiber system comprising first and second polarization-maintaining fibers, a first orthogonal coordinate system of the first polarization-maintaining fiber is azimuthally rotated relative to a second orthogonal coordinate system of the second polarization-maintaining fiber by the use of an optical coupler by a preselected angle between 0° and 90°, both exclusive. Preferably, the optical coupler is shorter than a beat length of each fiber and the preselected angle is equal to 45°. The optical fiber system is applicable to an optical sensor for sensing a variable physical parameter. In the sensor, a light beam is incident onto one end of the first polarization-maintaining fiber so that a plane of polarization of the light beam is matched to one of those planes of the first polarization-maintaining fiber which are determined by the first orthogonal coordinate system. A third polarization-maintaining fiber is coupled through an additional optical coupler to the second polarization-maintaining fiber. The optical fiber system can be manufactured either by twisting and locally fusing a single polarization-maintaining fiber or by splicing together two polariation-maintaining fibers.

13 Claims, 12 Drawing Figures

POLARIZATION-MAINTAINING FIBER SYSTEM AND METHOD OF MANUFACTURING THE SAME

BACKGROUND OF THE INVENTION

This invention relates to an optical fiber system including a polarization-maintaining fiber, to a method of manufacturing the optical fiber system, and to an optical sensor for sensing a variable physical parameter by the use of the optical fiber system. It should be noted here and throughout the specification that a polarization-maintaining fiber can allow light to pass therethrough with the planes of polarization of the light kept therein without substantial interference. Such a polarization-maintaining fiber is called a birefringent fiber because it has birefringence induced by the internal stress or an isotropic structure.

A conventional optical fiber system of the type described is applied to an interferometer, namely, an optical sensor for measuring or sensing a variable physical parameter, such as temperature, pressure, magnetic field, or the like, by making use of a phase difference between two fundamental polarization modes of light which are orthogonal to each other. Such an interferometer is simple in structure because two polarization modes can be transmitted through a single polarization-maintaining fiber. More specifically, the polarization-maintaining fiber has a guide portion for guiding the light beams without any interference and a sensing portion for sensing a variable physical parameter produced from an object, as will later be described with reference to one figure of the accompanying drawing. Both of the polarization modes are individually subjected to phase shifts during passage through the sensing portion. It is possible to measure a variation of the physical parameter by monitoring the phase shifts.

The interferometer is, however, disadvantageous in that both of the polarization modes are also subjected to phase shifts at the guide portion of the polarization-maintaining fiber when disturbance or perturbation noises take place at the guide portion. Such noises become serious as the guide portion is rendered long. Accordingly, it is difficult with the interferometer to precisely measure the variation of the physical parameter.

In the meanwhile, it is preferable that such an optical fiber system is applicable to a wide variety of uses.

SUMMARY OF THE INVENTION

It is an object of this invention to provide an optical fiber system which includes a polarization-maintaining fiber of wide application.

It is another object of this invention to provide a simple method for manufacturing an optical fiber system of the type described.

It is a further object of this invention to provide an optical sensor which comprises an optical fiber system of the type described and which can avoid any influence of perturbation noises taking place on a guide portion of the optical fiber system.

It is a yet further object of this invention to provide an optical sensor of the type described, which can detect a variation of a physical parameter with a high precision.

It is another object of this invention to provide an optical sensor of the type described, which can be remotely controlled by the use of a long guide portion.

According to this invention, an optical fiber system comprises a first polarization-maintaining fiber having a first longitudinal axis, a first plane along the first longitudinal axis, and a second plane orthogonal to the first plane to define a first orthogonal coordinate in cross section, a second polarization-maintaining fiber having a second longitudinal axis, a third plane along the second longitudinal axis, and a fourth plane surface orthogonal to the third plane to define a second orthogonal coordinate in cross section, and coupling means for coupling the first polarization-maintaining fiber to the second polarization-maintaining fiber with the first longitudinal axis matched to the second longitudinal axis and with the first orthogonal coordinate azimuthally different from the second orthogonal coordinate.

BRIEF DESCRIPTION OF THE DRAWING

FIG. 3, shows a view for describing operation of the optical sensor illustrated in FIG. 3;

DESCRIPTION OF THE PREFERRED EMBODIMENTS

Figure 1:
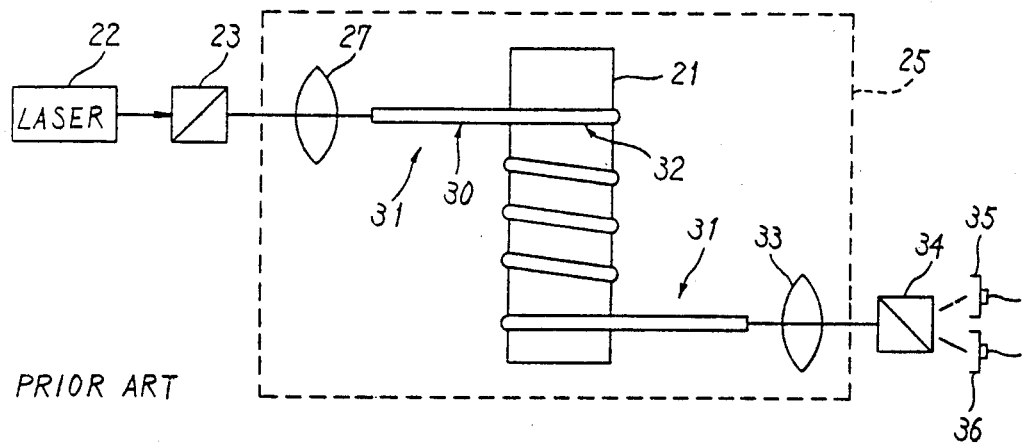
FIG. 1 shows a block diagram of a conventional optical sensor.

Referring to FIG. 1, a conventional optical sensor may be called a birefringent interferometer and is for use in combination with an object to measure a variable physical parameter, such as temperature. In FIG. 1, the object is exemplified by a cylinder, namely, a bobbin 21 of metal having a predetermined thermal expansion coefficient. The optical sensor comprises a laser 22, such as a He-Ne laser, for emitting a laser beam and a polarizer 23 for polarizing the laser beam into a linearly polarized beam having a predetermined plane of polarization.

The illustrated optical sensor comprises an optical fiber system 25 comprising an incoming optical system 27 represented by a convex lens and a single polarization-maintaining fiber 30 having a thermal expansion lower than that of the bobbin 21.

Figure 2:
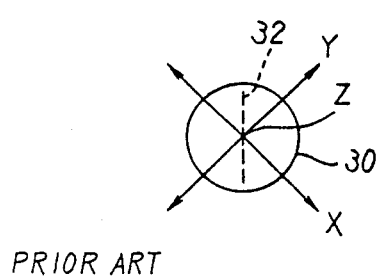
FIG. 2 shows a view for describing operation of the optical sensor illustrated in FIG. 1.

Temporarily referring to FIG. 2, the polarization-maintaining fiber 30 has a longitudinal axis Z, a first plane defined by a Y axis and the longitudinal axis Z in FIG. 2, and a second plane defined by a Y axis and the longitudinal axis Z. The first plane is orthogonal to the second plane to define an orthogonal coordinate system X-Y in the cross section of the fiber. The X and Y axes are referred to as first and second axes respectively.

Referring to FIGS. 1 and 2, the linearly polarized beam is incident as an incoming light beam onto a left-hand side end, namely, an incident end of the polarization-maintaining fiber 30, with the plane of polarization of the incoming light beam inclined at 45° to both of the first and the second axes X and Y, as depicted at dotted line 32 in FIG. 2. As a result, the incoming light beam is divided into first and second components or modes along the first and the second axes X and Y, respectively. It is known in the art that the polarization-maintaining fiber 30 has first and second propagation constants along the first and the second axes, respectively, and that a difference $\Delta\beta$ between the first and the second propagation constants is very large. As a result, the first and the second components are transmitted through the polarization-maintaining fiber 30 independently.

In FIG. 1, the polarization-maintaining fiber 30 has a sensing portion 32 wound around the bobbin 21 for sensing the temperature and a remaining portion 31 continuous to the sensing portion 32. The remaining portion may be referred to as a guide portion for guiding the first and the second components to and from the sensing portion 32.

Let the temperature of the bobbin 21 be varied during transmission of the first and the second components. Under the circumstances, the first and the second components are subjected to individual phase shifts in accordance with the variation of the temperature and supplied through a righthand end, namely, an outgoing end of the polarization-maintaining fiber 30 to an outgoing optical system 33 represented by a convex lens. As a result, a phase difference occurs between the first and second components. The first and the second components are given to an analyzer 34, such as a Wollaston polarizing prism. The prism 34 is oriented so that principal axes of the prism 34 are inclined at 45° to the orthogonal coordinate X-Y. Therefore, the first and the second components are combined by the prism 34 on each principal axis to produce a pair of outgoing light beams having intensities represented by sine and cosine waves dependent on the phase shifts. A pair of photo detectors 35 and 36 detect the intensities of the outgoing light beams to produce output signals representative of the intensities, respectively. The output signals are processed by a computer (not shown) to detect the variation of the temperature. A combination of the analyzer 34 and the photo detectors 35 and 36 is operable to receive the outgoing light beam.

With this structure, both of the first and the second components are allowed to pass through the guide portion as well as the sensing portion. Disturbance or perturbation often takes place at the guide portion. Such disturbance also gives rise to phase shifts of the first and the second components and becomes serious as the guide portion is lengthened, as pointed out in the background of the specification. This means that objectionable phase shifts are superimposed on the phase shifts to be measured by the optical sensor. Therefore, the illustrated sensor has a low minimum sensitivity.

Figure 3:
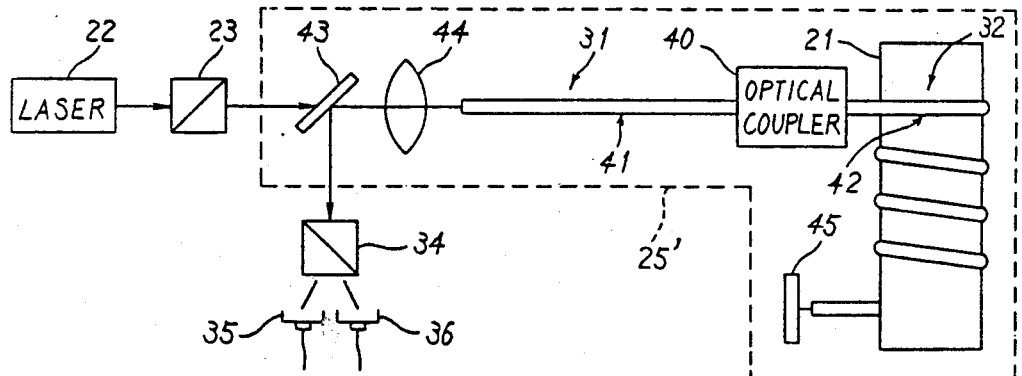
FIG. 3 shows a block diagram of an optical sensor according to a first embodiment of this invention.

Referring to FIG. 3, an optical sensor according to a first embodiment of this invention comprises similar parts designated by like reference numerals. The illustrated optical sensor comprises an optical fiber system 25' different from that illustrated in FIG. 1. The optical fiber system 25' comprises the guide portion 31 and the sensing portion 32 wound around the bobbin 21, as is the case with FIG. 1. It is, however, to be noted that the guide portion 31 is coupled to the sensing portion 32 through an optical coupler 40 in a manner to be described later.

Figure 4:
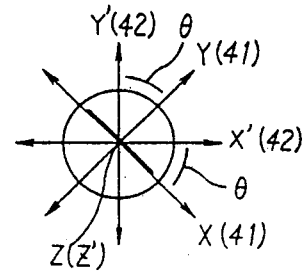
FIG. 4, depicted above

Referring to FIG. 4 together with FIG. 3, the guide portion 31 comprises a first polarization-maintaining fiber 41 having a first longitudinal axis Z, a first plane defined by an X-axis and the longitudinal axis, and a second plane defined by a Y-axis and the longitudinal axis and orthogonal to the first plane, like in the polarization-maintaining fiber 30 illustrated in FIG. 1. An orthogonal coordinate (X-Y) is defined in cross section, as illustrated in FIG. 4. The first polarization-maintaining fiber 41 further has a first end directed leftwards of FIG. 3 and a second end coupled to the optical coupler 40 and opposed to the first end.

The sensing portion 32 comprises a second polarization-maintaining fiber 42 wound around the bobbin 21. The second polarization-maintaining fiber 42 has a second longitudinal axis indicated at Z'. The second polarization-maintaining fiber 42 has a third plane along the second longitudinal axis and a fourth plane orthogonal to the third plane to define a second orthogonal coordinate X'-Y' in cross section. Let the third and the fourth planes be defined by an X' axis and the second longitudinal axis Z' and by a Y'-axis and the second longitudinal axis Z', respectively. The second polarization-maintaining fiber 42 has third and fourth ends depicted at an upper and lower portions of FIG. 3, respectively. The third end is coupled to the optical coupler 40.

As readily understood from FIG. 4, the optical coupler 40 is for coupling the first polarization-maintaining fiber 41 to the second polarization-maintaining fiber 42 with the first longitudinal axis Z matched to the second longitudinal axis Z' and with the first orthogonal coordinate X-Y azimuthally different from the second orthogonal coordinate X'-Y' by a predetermined angle $\theta$. It is assumed that the predetermined angle $\theta$ is between 0° and 90°, both exclusive, and is substantially equal to 45° by way of example.

It is needless to say that each of the first and the second polarization-maintaining fibers 41 and 42 is possessed of the same property as the polarization-maintaining fiber 30 illustrated in FIG. 1. Let a difference $\Delta\beta$ between two propagation constants of the first polarization-maintaining fiber 41 be equal to that between two propagation constants of the second polarization-maintaining fiber 42.

In FIG. 3, the illustrated optical fiber system 25' further comprises a beam splitter 43 and a convex lens 44 both of which are adjacent to the first end of the first polarization-maintaining fiber 41. A reflector or a mirror 45 is placed in the proximity of the fourth end of the second polarization-maintaining fiber 42.

With this structure, the polarizer 23 which is supplied with the laser beam from the laser 22 is oriented to produce a linearly polarized beam having a plane of polarization matched with either the first or the second axis of the first polarization-maintaining fiber 41. The linearly polarized beam is transmitted along the first longitudinal axis Z and the second longitudinal axis Z' matched with the first longitudinal axis Z. It is surmised that the plane of polarization of the linearly polarized beam is matched with the first axis X, as suggested by a thick line in FIG. 4. The linearly polarized beam is sent as an incoming light beam through the beam splitter 43 and the convex lens 45 to the first end. The incoming light beam travels through the first polarization-maintaining fiber 41 to the optical coupler 40 with the plane of polarization kept substantially unchanged.

Thus, the incoming light beam has a single plane of polarization while it passes through the first polarization-maintaining fiber 41. Thus, the incoming light beam is not separated into two components or modes in the first polarization-maintaining fiber 41. Accordingly, no phase difference in the incoming light beam takes place in the first polarization-maintaining fiber 41 even when disturbance is imposed on the incoming light beam.

The incoming light beam reached to the optical coupler 40 is divided into first and second components which are orthogonal to each other and which travel along the third plane X'-Z' and the fourth plane Y'-Z', respectively. The first and the second components are transmitted through the second polarization-maintaining fiber 42 to the fourth end with the planes of polarization of the first and the second components kept substantially invariable. The first and second components is subjected to individual phase shifts dependent on the variation of temperature.

The first and the second components energizing from the fourth end is reflected on the mirror 45 to be sent back from the fourth end to the optical coupler 40 through the second polarization-maintaining fiber 42 as the reflected light beam. The reflected light beam is subjected to phase shifts again in the second polarization-maintaining fiber 42. The first and the second components of the reflected light beam are combined with each other by the optical coupler 40 to rotate the orthogonal coordinates from the second one (X'-Y') to the first one (X-Y). As a result, the reflected light beam has first and second rotated components along the first and the second planes X-Z and Y-Z, respectively.

The reflected light beam is emitted from the first end through the first polarization-maintaining fiber 41 to be delivered through the convex lens 44 and the beam splitter 43 to a receiving section as an outgoing light beam.

The receiving section comprises an analyzer 34, such as a Wollaston polarizing prism, as is the case with FIG. 1. It is, however, to be noted that the illustrated analyzer 34 is oriented so that the principal axes of the analyzer 34 are matched to the first and the second axes X and Y of the first polarization-maintaining fiber 41. Anyway, the outgoing light beam is separated by the analyzer 34 into first and second output components resulting from the first and the second rotated components, respectively. The first and the second converted components are supplied to the first and the second photo detectors 35 and 36 in the manner described in conjunction with FIG. 1. Thus, first and the second photo detectors 35 and 36 produce first and second output signals representative of intensities of the first and the second rotated components which are dependent on the variation of the temperature. It is, thereofore, possible to measure the variation of the temperature by monitoring the first and the second output signals. Thus, the first and the second photo detectors 35 and 36 individually detect the first and the second rotated components traveling along the first and the second planes of the first polarization-maintaining fiber 41, respectively. From this fact, it is readily understood that the first and the second output signals are not adversely affected by any phase shifts which result from any intercorrelation between the first and the second rotated components, even when disturbance is imposed on the first and the second rotated components at the guide portion.

Although the mirror 45 is placed in the proximity of the fourth end of the second polarization-maintaining fiber 42, the mirror 45 may be replaced by at least one of a dielectric layer, a gold layer, a silver layer, and an aluminum layer that is directly covered on the fourth end.

Figure 5:
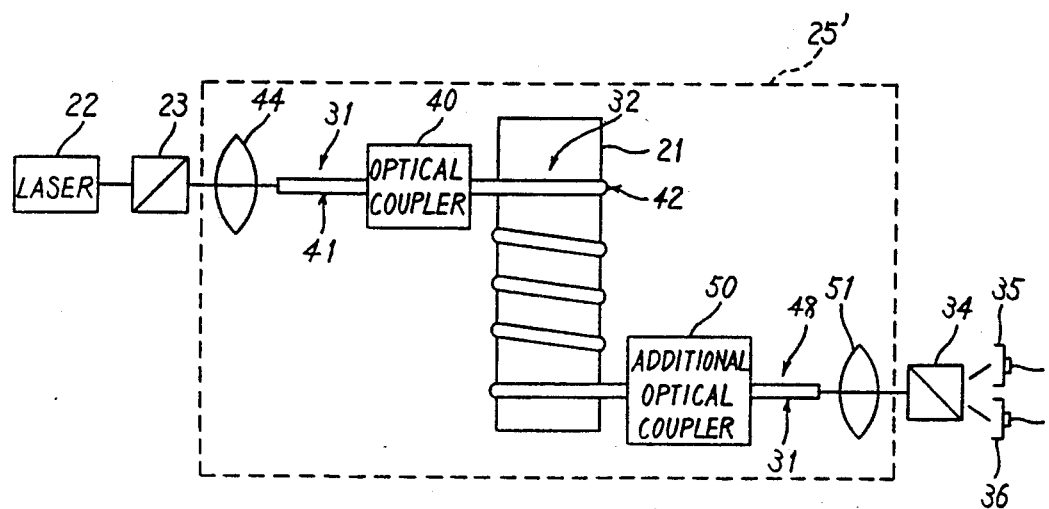
FIG. 5 shows a block diagram of an optical sensor according to a second embodiment of this invention.

Referring to FIG. 5, an optical sensor according to a second embodiment of this invention comprises similar parts designated by like reference numerals and carries out unidirectional transmission of a light beam. In this connection, the beam splitter 43 and the mirror 45 illustrated in FIG. 3 are removed from FIG. 5. In FIG. 5, the optical fiber system 25' comprises a third polarization-maintaining fiber 48 which serves as the guide portion 31 together with the first polarization-maintaining fiber 41. The third polarization-maintaining fiber 48 has a third longitudinal axis extended along the second longitudinal axis and fifth and sixth ends which are transverse to the third longitudinal axis and which are directed leftwards and rightwards of FIG. 5, respectively. The third polarization-maintaining fiber 48 has a fifth plane along the third longitudinal axis and a sixth plane orthogonal to the fifth plane to define a third orthogonal coordinate in cross section. It is assumed that the third polarization-maintaining fiber 48 has the same difference of propagation constants as each of the first and the second polarization-maintaining fibers 41 and 42. The fifth plane is defined by a polarization axis and the third longitudinal axis and the sixth plane is defined by another polarization axis and the third longitudinal axis, as in the first and second polarization-maintaining fibers 41 and 42.

An additional optical coupler 50 is placed between the fourth and the fifth ends. The additional optical coupler 50 couples the second and the third polarization-maintaining fibers 42 and 48 so that the second longitudinal axis is matched to the third longitudinal axis and that the second orthogonal coordinate is azimuthally different from the third orthogonal coordinate by a preselected angle. The preselected angle may be between 0° and 90°, both exclusive. In the example being illustrated, the preselected angle is equal to 45° and the third orthogonal coordinate is therefore matched to the first orthogonal coordinate X-Y.

The linearly polarized beam which has the plane of polarization matched to the first plane (X-Z) is incident as the incoming light beam onto the first end of the first polarization-maintaining fiber 41 through the convex lens 44. The incoming light beam is transmitted to the additional optical coupler 50 through the first polarization-maintaining fiber 41, the optical coupler 40, and the second polarization-maintaining fiber 42 in the manner described in conjunction with FIG. 3. Therefore, the incoming light beam is divided into the first and the second components traveling along the third and the fourth planes (X'-Z') and (Y'-Z') in the second polarization-maintaining fiber 42, respectively. Inasmuch as the additional optical coupler 50 serves to change the orthogonal coordinates from the second one to the third one, as mentioned before, the first and the second components are converted by the additional optical coupler 50 into first and second converted components traveling along the fifth and the sixth planes, respectively. The first and the second converted components are sent through an outgoing optical system (represented by a convex lens 51) to the analyzer 34, such as a Wollaston polarizing prism, which is oriented so that the principal axes of the analyzer 34 are matched to the fifth and the sixth planes. Thus, the first and the second converted components are detected by the first and the second photo detectors 35 and 36, respectively, in the manner described in conjunction with FIG. 3. As a result, the first and the second photo detectors 35 and 36 produce the first and the second output signals representative of the variation of temperature.

Figure 6:
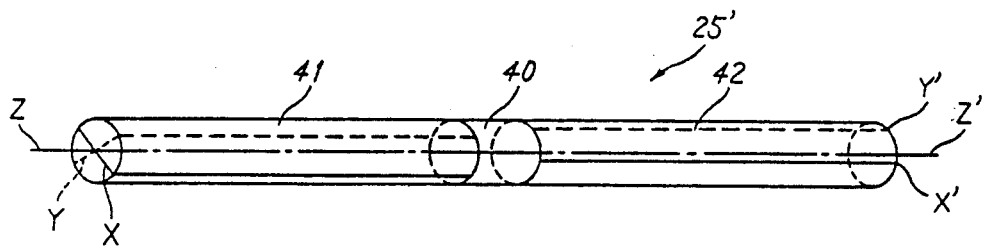
FIG. 6 shows a schematic perspective view of an optical fiber system for use in the optical sensor illustrated in FIGS. 3 and 5.

Referring to FIG. 6, an optical fiber system 25' which is applicable to each optical sensor illustrated in FIGS. 3 and 5 comprises first and second polarization-maintaining fibers 41 and 42 similar to those illustrated in FIGS. 3 and 5. For convenience of description, the first orthogonal coordinate of the first polarization-maintaining fiber 41 is shown at X-Y while the second orthogonal coordinate of the second polarization-maintaining fiber 42, X'-Y'. Like in FIGS. 3 and 5, the first polarization-maintaining fiber 41 has the first longitudinal axis Z, the first plane defined by X-Z, and the second plane defined by Y-Z. The first polarization-maintaining fiber 41 further has the first and the second ends which are transverse to the first longitudinal axis and which are directed leftwards and rightwards of FIG. 6. Similarly, the second polarization-maintaining fiber 42 has the second longitudinal axis Z', the third plane defined by X'-Z', and the fourth plane defined by Y'-Z'. The second polarization-maintaining fiber 42 further has the third and the fourth ends which transverse to the second longitudinal axis Z' and which are directed leftwards and rightwards of FIG. 6.

Propagation constants in the first polarization-maintaining fiber 41 are assumed to be equal to that in the second polarization-maintaining fiber 42.

The illustrated optical fiber system 25' comprises the optical coupler 40 between the first and the second polarization-maintaining fibers 41 and 42. More specifically, the optical coupler 40 is composed of a block brought into direct contact with the second end and the third end. Stated otherwise, the block is continuous to the first and the second polarization-maintaining fibers 41 and 42. As a result, there is no gap between the block and the first polarization-maintaining fiber 41, respectively and between the block and the second polarization-maintaining fiber 42. For convenience of description, let the block have first and second block ends brought into contact with the second and the third ends of the first and the second polarization-maintaining fibers 41 and 42, respectively. The block consists of the same material as the first and the second polarization-maintaining fibers 41 and 42. Preferably, the block is shorter than a beat length L given by $2\pi/\Delta\beta$ where $\Delta\beta$ represents the difference of propagation constants in each fiber 41 and 42. Such a block serves to avoid any noise and to keep each phase of the light beams stable.

As shown in FIG. 6, the block couples the first and a peripheral surface of the second polarization-maintaining fibers 41 and 42 with the first longitudinal axis Z matched to the second longitudinal axis Z' and with the first orthogonal coordinate X-Y azimuthally different from the second orthogonal coordinate X'-Y'. Such an azimuthal difference may be between 0° and 90°, both exclusive, as mentioned in conjunction with FIG. 4.

By way of example, birefringent fibers with high internal lateral stress was used as the first and the second polarization-maintaining fibers 41 and 42. The birefringent fibers were of silica glass and had a fiber diameter of 125 microns, a core diameter of 4 microns, and a beat length L of 5 millimeters. The birefringent fibers were coupled through the optical coupler 40 of 100 microns long. In this event, the azimuthal difference was equal to 45°. Thus, the length of the optical coupler 40 was shorter than one tenth of the beat length L.

Figure 7:
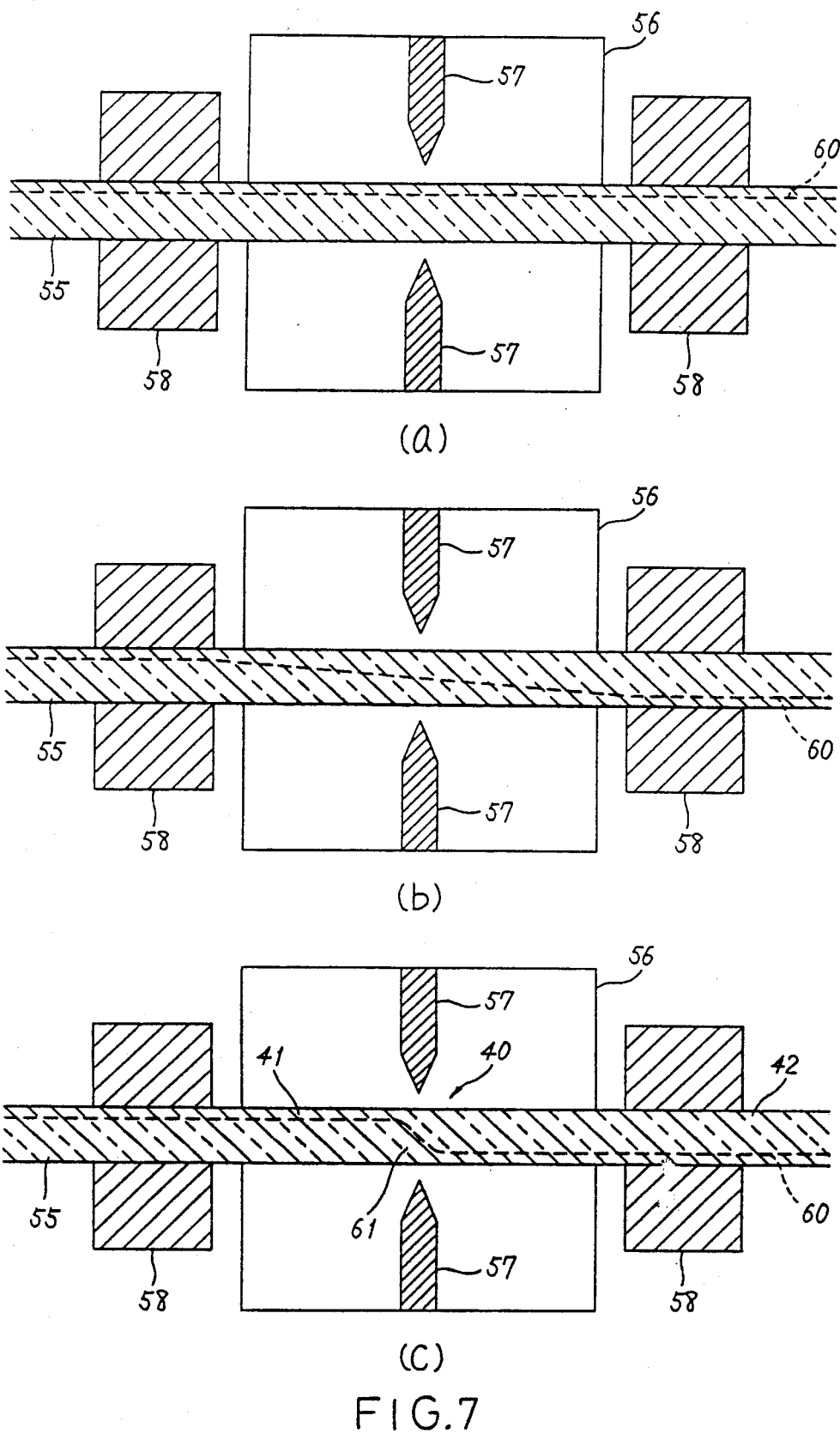
FIG. 7 schematically shows an axial sectional view for describing a method of manufacturing the optical fiber system illustrated in FIG. 6.

Referring to FIG. 7, a method of manufacturing the optical fiber system 25' illustrated in FIG. 6 will be described for a better understanding of this invention. In FIG. 7(a), a single-polarization-maintaining fiber 55 is prepared together with an electrical discharge machining apparatus 56 which comprises a housing defining a hollow space and a pair of spark electrodes 57 fixed to the housing. The spark electrodes 57 are opposed in the hollow space to each other with a gap left therebetween. The polarization-maintaining fiber 55 is introduced into the hollow space to be interposed between the spark electrodes 57 and fastened to a pair of rotation adjustable jigs 58. A broken line 60 specifies an intersection line between the second plane Y-Z (illustrated in FIG. 6) and the polarization-maintaining fiber 55. As shown in FIG. 7(a), the intersection line 60 is extended along a longitudinal axis of the polarization-maintaining fiber 55 as long as the jigs 58 are not driven.

Under the circumstances, the polarization-maintaining fiber 55 is twisted by driving the jigs 58 so as to rotate the righthand side of the fiber 55 relative to the lefthand side thereof. In the example being illustrated, the righthand side is rotated by 45° relative to the lefthand side. As a result, the intersection line 60 is gradually and gently bent from an upper portion of the fiber 55 to a lower portion thereof, as shown in FIG. 7(b).

Thereafter, sparks are caused to occur several times between the spark electrodes 57 to locally fuse the polarization-maintaining fiber 55 at an intermediate portion between the lefthand and the righthand sides. Each spark lasts a duration of 0.1 second during which an electric current of 15 mA flows between the spark electrodes 57. Thus, the polarization-maintaining fiber 55 is locally fused at a portion 61 laid between the spark electrodes 57, as shown in FIG. 7(c). The portion 61 has a length of 100 microns shorter than the beat length L of 5 mm and serves as the optical coupler 40 illustrated in FIG. 3. When the polarization-maintaining fiber 55 is released from twisting force, the optical fiber system is completed which comprises the first and the second polarization-maintaining fibers 41 and 42 coupled through the optical coupler 40. As readily understood from FIG. 7(c), an orthogonal coordinate is continuously changed in the optical coupler 40 from the first orthogonal coordinate to the second orthogonal coordinate.

Figure 8:
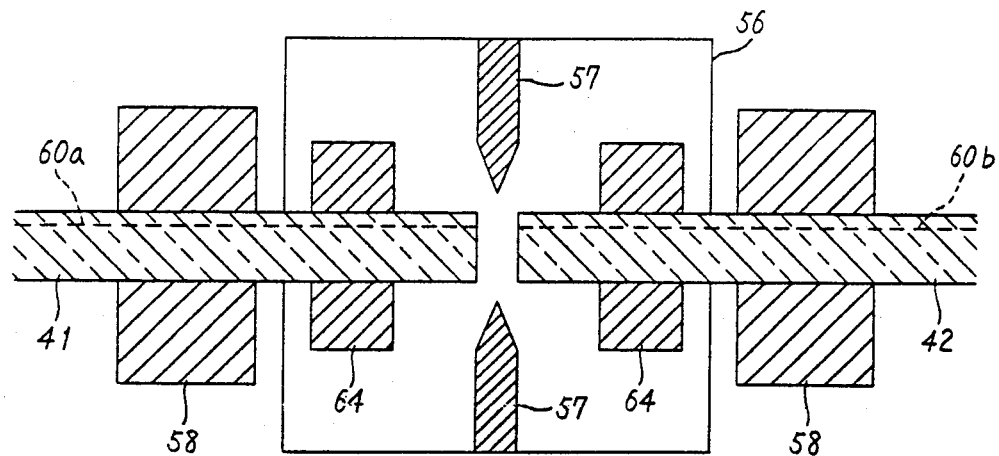
FIG. 8 schematically shows an axial sectional view for describing another method of manufacturing the optical fiber system illustrated in FIG. 6.
Figure 8:
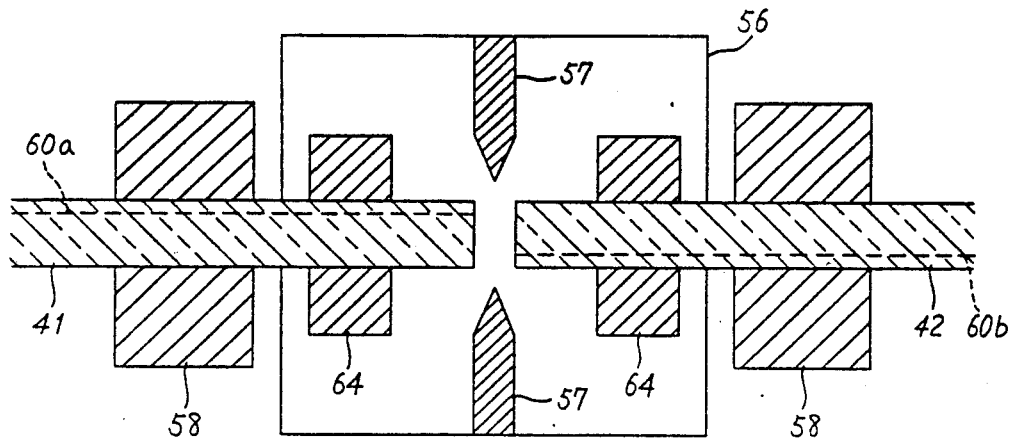
Figure 8:
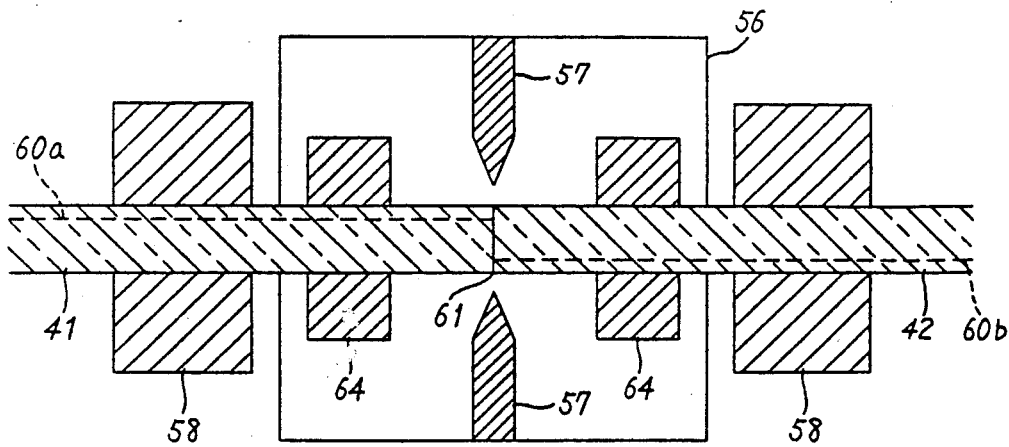

Referring to FIG. 8, another method of manufacturing the optical fiber system 25' may be called a splicing method. In this event, provision is made of the first and the second polarization-maintaining fibers 41 and 42. Both of the polarization-maintaining fibers 41 and 42 are spliced by the use of an electrical discharge machining apparatus 56. The apparatus 56 is similar to that illustrated in FIG. 7 except that a pair of three axis adjustment jigs 64 are put in the hollow space so as to adjust three axes of each of the first and the second polarization-maintaining fibers 41 and 42. In FIG. 8(a), the first and the second polarization-maintaining fibers 41 and 42 are set so that both of the intersection lines (depicted at 60a and 60b) are matched to each other along each longitudinal axis.

Under the circumstances, the first and the second polarization-maintaining fibers 41 and 42 are rotated by the use of the rotation adjustable jigs 58 relative to each other so that an angle difference between the fibers 41 and 42 becomes equal to 45°. As a result, the intersection line 60a of the first polarization-maintaining fiber 41 is offset from the intersection line 60b of the second polarization-maintaining fiber 42, as shown in FIG. 8(b).

Subsequently, the first polarization-maintaining fiber 41 is brought into contact with the second polarization-maintaining fiber 42 at end portions of both fibers by the use of the adjustment jigs 64, as illustrated in FIG. 8(c). The spark electrodes 57 are energized to cause sparks to occur a duration of 0.2 second therebetween. As a result, the first and the second polarization-maintaining fibers 41 and 42 are fused to be coupled to each other at a coupling portion 61.

With this method, the coupling portion 61 is very short in length in comparison with that illustrated in FIG. 7(c). The length of the coupling portion 61 may be substantially equal to zero. In this connection, the first orthogonal coordinate is discretely coupled to the second orthogonal coordinate by the coupling portion 61. In this event, the ends of the first and the second polarization-maintaining fibers 41 and 42 may be regarded as contact surfaces of the coupling portion 61. In this sense, the coupling portion 61 may be called an optical coupler.

Instead of the spark electrodes, either a micro-torch or a laser beam may be used to fuse the fiber 41 and 42. A resistance heating technique may be utilized. Alternatively, the first and the second polarization-maintaining fibers 41 and 42 are connected to each other by the use of an adhesive.

While this invention has thus far been described in conjunction with a few embodiments thereof, it will readily be possible for those skilled in the art to put this invention into practice in various manners. For example, each of the first and the second polarization-maintaining fibers 41 and 42 may be an elliptical core fiber. The optical coupler 40 illustrated in FIGS. 3 and 5 may be a space gap or an isotropic material. The optical sensor illustrated in FIGS. 3 and 5 is applicable to measure magnetic field or pressure. In this case, the bobbin 14 may be made of a magnetostrictive material or a resilient material having a coefficient of elasticity greater than that of the fiber 42. A difference of propagation constants in each of the first through the third polarization-maintaining fibers 41, 42, and 48 may be different from one another. Anyway, the length of the optical coupler 40 may be shorter than a maximum beat length determined by a minimum difference of propagation constants.

What is claimed is:

1. An optical fiber system comprising:
   a first polarization-maintaining fiber having a first longitudinal axis, a first plane along said first longitudinal axis, and a second plane orthogonal to said first plane to define a first orthogonal coordinate system in cross section;
   a second polarization-maintaining fiber having a second longitudinal axis, a third plane of polarization along said second longitudinal axis, and a fourth plane orthogonal to said third plane to define a second orthogonal coordinate system in cross section; and
   coupling means for coupling said first polarization-maintaining fiber to said second polarization-maintaining fiber with said first longitudinal axis matched to said second longitudinal axis and with said first orthogonal coordinate system azimuthally offset from said second orthogonal coordinate system.

2. An optical fiber system as claimed in claim 1, said first and said second polarization-maintaining optical fibers having first and second differences of propagation constants, respectively, and being defined by first and second beat lengths determined by said first and second differences of propagation constants, respectively, wherein said coupling means comprises:
   a block having a length shorter than each of said first and said second beat lengths for coupling said first and said second polarization-maintaining optical fibers without any gap between said block and said first polarization-maintaining optical fiber and between said block and second polarization-maintaining optical fiber.

3. An optical fiber system as claimed in claim 2, wherein said block has first and second contact surfaces brought into contact with said first and said second polarization-maintaining fibers, respectively, and internal orthogonal coordinates continuously varied so that said internal orthogonal coordinates are matched to said first and said second orthogonal coordinates on said first and said second contact surfaces, respectively.

4. An optical coupler for use in an optical fiber system comprising a first and a second polarization-maintaining optical fiber, said first polarization-maintaining optical fiber having a first longitudinal axis, a first and a second end disposed transversely of said first longitudinal axis, a first plane along said first longitudinal axis, and a second plane orthogonal to said first plane to define a first orthogonal coordinate system in cross section, said second polarization-maintaining fiber having a second longitudinal axis, a third and a fourth end disposed transversely of said second longitudinal axis, a third plane along said second longitudinal axis, and a fourth plane polarization orthogonal to said third plane to define a second orthogonal coordinate system in cross section, said optical coupler comprising a block having first and second contact surfaces to be brought into contact with said second and said third ends, respectively, for coupling said first and said second polarization-maintaining fibers with said first longitudinal axis matched to said second longitudinal axis and with said first orthogonal coordinates system azimuthally offset from said second orthogonal coordinate system.

5. An optical coupler as claimed in claim 4, said first polarization-maintaining fiber having, along said first and said second planes, a first propagation constant and a second propagation constant different from said first propagation constant, respectively, and a first beat length determined by a first difference between said first and said second propagation constants while said second polarization-maintaining fiber has, along said third and said fourth planes, a third propagation constant and a fourth propagation constant different from said third propagation constant, respectively, and a second beat length determined by a second difference between said third and said fourth propagation constants, wherein said block has along each of said first and said second longitudinal axes, a predetermined length shorter than each of said first and said second beat lengths.

6. In an optical sensor for use in combination with an object to measure a predetermined, variable physical parameter, said optical sensor comprising light source means for generating a light beam having an optical axis, an optical fiber system having a guide portion for guiding said light beam and a sensing portion optically coupled to said guide portion and said object for sensing said predetermined, variable physical parameter, and receiving means for receiving the light beam emitted from said optical fiber system, the improvement wherein said guide portion comprises:

a first polarization-maintaining fiber having a first longitudinal axis along said optical axis, a first end which is transverse to said first longitudinal axis and onto which said light beam is incident, a second end transverse to said first longitudinal axis, a first plane along said first longitudinal axis, and a second plane orthogonal to said first plane to define a first orthogonal coordinate system in cross section;

said sensing portion comprising:

a second polarization-maintaining fiber having a second longitudinal axis, a third and fourth end transverse to said second longitudinal axis, a third plane along said second longitudinal axis, and a fourth plane orthogonal to said third plane to define a second orthogonal coordinate system in cross section;

said optical fiber system comprising:

coupling means between said second and said third ends for optically coupling said first and said second polarization-maintaining fibers with said first longitudinal axis matched to said second longitudinal axis and with said first orthogonal coordinate system azimuthally offset from said second orthogonal coordinate system by a predetermined angle.

7. An optical sensor as claimed in claim 6, wherein said predetermined angle is substantially equal to 45°.

8. An optical sensor as claimed in claim 6, wherein said light source means comprises:

a laser for producing a laser beam; and a polarizer for polarizing said laser beam into a linearly polarized beam having a plane of polarization matched to either one of said first and said second planes to produce said linearly polarized beam as said light beam.

9. An optical sensor as claimed in claim 8, wherein said optical fiber system comprises:

a reflector adjacent to said fourth end for reflecting the light beam from said fourth end towards said first end as a reflected light beam; and an optical system adjacent to said first end and optically coupled to said light source means, said first polarization-maintaining fiber, and said receiving means for delivering said linearly polarized beam to said first polarization-maintaining fiber through said first end and for delivering the reflected light beam emitted from said first end to said receiving means.

10. An optical sensor as claimed in claim 8, wherein said guide portion comprises:

a third polarization-maintaining fiber having a third longitudinal axis, fifth and sixth ends disposed transversely of said third longitudinal axis, a fifth plane along said third longitudinal axis, and a sixth plane orthogonal to said fifth plane to define a third orthogonal coordinate system in cross section, said optical fiber system further comprising:

additional coupling means between said fourth and said fifth ends for coupling said second and said third polarization-maintaining optical fibers with said third longitudinal axis matched to said second longitudinal axis and with said second orthogonal coordinate system azimuthally offset from said third orthogonal coordinate by a preselected angle between 0° and 90°, both exclusive.

11. An optical sensor as claimed in claim 10, wherein said optical fiber system further comprises:

a first optical system adjacent to said first end for sending said linearly polarized beam to said first end as said light beam; and a second optical system adjacent to said sixth end for delivering the light beam emitted from said sixth end to said receiving means.

12. A method of manufacturing the optical fiber system claimed in claim 1, said method comprising the steps of:

preparing a single polarization-maintaining fiber having a longitudinal axis, a predetermined plane along said longitudinal axis, and an additional plane orthogonal to said predetermined plane to define a predetermined orthogonal coordinate system in cross section, said polarization-maintaining fiber being divisible along said longitudinal axis into a first portion, a second portion spaced apart from said first portion, and an intermediate portion between said first and said second portions; and twisting said first portion relative to said second portion around said longitudinal axis to azimuthally rotate the predetermined orthogonal coordinate system of said first portion relative to that of said second portion by a prescribed angle between 0° and 90°, both exclusive, and, thereby, to render said first and said second portions into said first and said second polarization-maintaining fibers, respectively, both of which are coupled through said coupling means formed at said intermediate portion between said first and said second polarization-maintaining fibers.

13. A method of manufacturing the optical fiber system claimed in claim 1, said method comprising the steps of:

preparing said first and said second polarization-maintaining fibers having first and second end portions, respectively;

aligning said first longitudinal axis to said second longitudinal axis with said first and said second end portions opposed to each other;

azimuthally rotating said first polarization-maintaining fiber relative to said second polarization-maintaining fiber around the aligned said first and said second longitudinal axes by a preselected angle between 0° and 90°, both exclusive; and splicing said first and said second polarization-maintaining fibers, with said first longitudinal axis aligned with said second longitudinal axis and with said preselected angle kept unchanged, so as to form said coupling means between said first and said second end portions.

* * * * *